May 29, 1951     W. R. SMITH ET AL     2,554,884
WORK HOLDER
Filed May 26, 1950
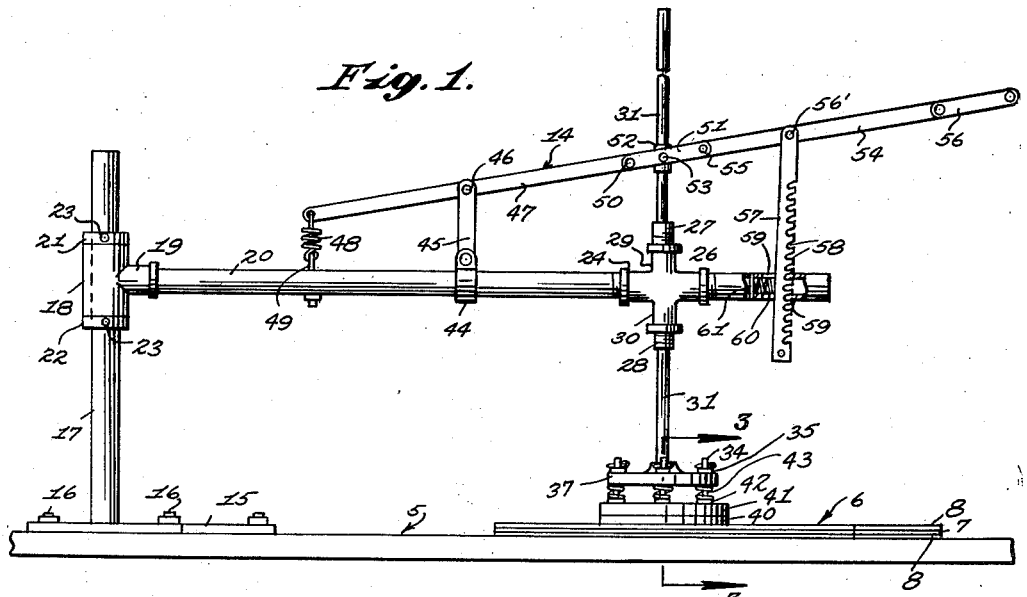
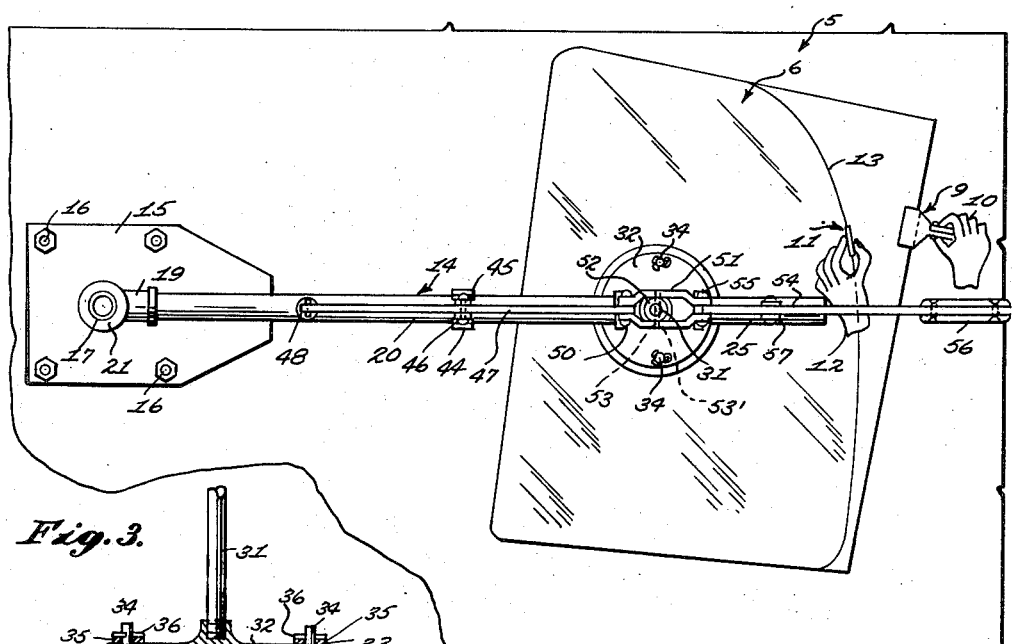
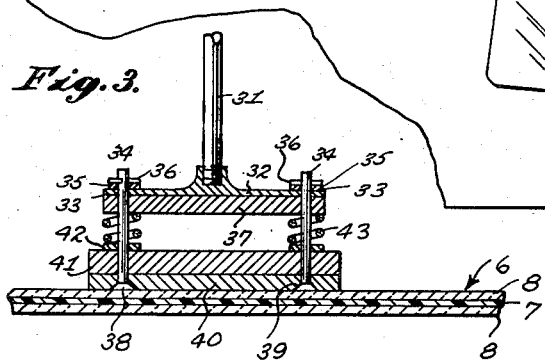
INVENTOR.
WILLIAM R. SMITH
BY OTTO R. RICKEL
McMorrow, Berman + Davidson
ATTORNEYS Patented May 29, 1951

2,554,884

UNITED STATES PATENT OFFICE 2,554,884

WORK HOLDER

William R. Smith and Otto R. Rickel,
New Orleans, La.

Application May 26, 1950, Serial No. 164,466

5 Claims. (Cl. 154—2.7)

This invention relates to improvements in means for holding flat work on work tables during cutting and other operations, and more particularly to a holder of this type especially, but not necessarily, for holding laminated safety glass on a work table, the primary object of the invention being to provide an efficient, serviceable, easily adjusted, and reliable device of this kind which besides leaving both hands of the operator free for pulling the glass on the table while cutting through the plastic center layer or lamination, clamps the glass with sufficient pressure onto the table to prevent slipping of the glass and pulling out of the plastic layer during the shifting and cutting operations.

Other important objects and advantageous features of the invention will be apparent from the following description and the accompanying drawings, wherein, for purposes of illustration only, a specific embodiment of the invention is set forth in detail.

In the drawings, wherein like numerals designate like parts throughout the several views:

Figure 1 is a general side elevation showing a plate of safety glass held on a work table by the illustrated device;

Figure 2 is a top plan view illustrating a cutting operation; and

Figure 3 is an enlarged transverse vertical section taken on line 3—3 of Figure 1.

Referring in detail to the drawings, the numeral 5 generally designates the top of a cutting table upon which is laid the laminated safety glass plate 6 to be cut, and which is characterized by a plastic center layer 7 between two glass layers 8. In a cutting operation, in accordance with the present invention, such as is illustrated in Figure 2, the operator uses a pliers 9 in his right hand 10 to pull the glass plate 6 along the table top 5 while applying a razor blade 11 to the plastic center layer 7 with his left hand 12, the cut thereby following the desired pattern curve or outline 13, while the glass plate 6 is held down upon the table top 5 by the holder, generally designated 14.

The holder 14 comprises a base plate 15 secured to the table top 5 by suitable means, such as the bolts 16, from which rises a fixed cylindrical standard 17. Slidable and rotatable on the standard 17 is a sleeve 18 having a radial socket 19 in or to which is secured the inward end of a preferably tubular arm 20 arranged parallel to the table top 5. Collars 21 and 22, respectively, arranged above and below the sleeve 18 have set screws therein to engage the standard 17 to hold the sleeve 18 and hence the arm 20 at the desired height above the table top while leaving the arm 20 free to swing on the vertical axis of the standard 17.

An erect, cruciform, tubular fitting has a horizontal arm 24 threaded on the outward end of the arm 20 and has a short, tubular extension 25 threaded into its other horizontal arm 26. Upper and lower tubular bushings 27 and 28, respectively, are threaded in the upper and lower arms 29 and 30, respectively, of the cruciform fitting, and are slidably traversed by a shaft or rod 31 which is perpendicular of the table top 5.

Threaded on the lower end of the rod 31 is a circular metal plate or disc 32 having equally circumferentially spaced holes 33 through which slide vertical bolts 34, with washers 35 on the bolts above the plate 32, and cotter pins 36 traversing the bolts and bearing upon the washers. The bolts 34 also traverse a disc 37 of such material as plywood which engages the under side of and is of the same size as the metal disc 32. The heads 38 on the lower ends of the bolts are countersunk, as indicated at 39, in the under side of a rubber disc 40 which the bolts 34 traverse, and which is somewhat larger in diameter than the discs 32 and 37. Also traversed by the bolts 34 and registered with the top of the rubber disc 40 is a disc 41 of such material as plywood. On the bolts 34 and engaging the top of the disc 41 are washers 42, and positioned between the washers 42 and the under side of the disc 37 are helical springs 43 which are circumposed on the bolts 34. The result is a yieldable pressure foot, whereby, as shown in Figure 3, the rubber disc 40 makes direct pressure contact with the top of the glass plate 6.

The means for applying downward pressure to the pressure foot and holding such pressure comprises a pivot bracket involving a U-shaped clamp 44 embracing the arm 20 at a point inwardly of the cruciform fitting having a fixed clevis 45 rising therefrom and carrying a pivot 46 at its upper end. A lever bar section 47 is pivoted intermediate its ends on the pivot 46 between the sides of the clevis. A contractile retracting spring 48 is stretched between the inward end of the bar section 47 and an eye 49 secured to the arm 20. Secured to opposite sides of the forward end of the lever bar section 47 at 50 are two oppositely laterally offset pieces 51 to and between which is positioned a swivel bushing 52 having pins 53 loosely engaging in holes 53' provided in the pieces 51, and the bushing 52 is secured in suitable manner to the rod or shaft 31. Another lever bar section 54, aligned with the lever bar section 47, has its inward end secured at 55 to and between the outward ends of the pieces 51, and has handle pieces 56 secured on opposite sides of its outward end, resulting in a rigid hand lever.

Pivoted at 56' to depend from the lever bar section 54 between its ends, and freely swingable relative thereto is the catch or latch bar 57 having a vertical series of notches 58 along its forward edges. The latch bar depends through a longitudinal slot 59 formed in the tubular extension 25 of the arm 20, the slot 59 being longer than the width of the catch or latch bar 57, so that the bar 57 works freely in the slot 59 both vertically and outwardly and inwardly. Inwardly of and engaging the inward edge of the bar 57 is a helical spring 60 in the extension 25 which is compressed between a pin 61 traversing the extension and the inward edge of the bar 57, so that the bar 57 is yieldably pressed in and outward direction to engage one of the notches 58 with the outward edge of the slot 59, whereby vertical movement of the bar 57, hence of the lever, of the rod 31, and the pressure foot relative to the table top 5, is precluded.

It will be obvious from the foregoing that with the glass plate 6 on the table top 5, the operator grasps the handle provided by the handle pieces 56 with one hand while holding the lower end of the catch bar 57 in a rearward position in the slot 59 with the other hand, lifts up on the lever bar to elevate the pressure foot above the table top, and the glass plate 6, and swings the assembly in the standard 17 to position the pressure foot over the glass plate 6. The lever is then depressed to contact the pressure foot with the glass plate 6 and exert the desired downward holding pressure on the glass plate, whereupon the catch bar 57 is released so that the spring 60 can move the bar 57 outwardly and engage one of its notches 58 with the outward edge of the slot 59, whereby the desired pressure upon the glass plate 6 is maintained until released by the operator. It will be observed that to release the pressure upon the glass plate 6 all that is necessary to do is to push the latch bar 57 rearwardly to disengage the engaged one of the notches 58, whereupon the retracting spring 48 and the springs 43 of the pressure foot are freed to effect upward movement of the rod 31 and associated hand lever.

We claim:

1. A work holder comprising a relatively stationary base, a standard projecting from said base, an arm projecting laterally from said standard, a rod slidably mounted on said arm for endwise movement substantially at right angles to said arm toward and away from work to be held, a pressure foot on the end of said rod at one side of said arm for engagement with work, a hand lever pivoted on said arm on the side thereof opposite said pressure foot, said hand lever being operatively connected to said rod to move said rod endwise as said lever is swung toward and away from said arm, a catch bar on said hand lever having notches therein, said catch bar extending across said arm, said arm having a portion with which said notches are engageable to hold said hand lever in selected positions.

2. A work holder comprising a relatively stationary base, a standard projecting from said base, an arm projecting laterally from said standard, a rod slidably mounted on said arm for endwise movement substantially at right angles to said arm toward and away from work to be held, a pressure foot on the end of said rod at one side of said arm for engagement with work, a hand lever pivoted on said arm on the side thereof opposite said pressure foot, said hand lever being operatively connected to said rod to move said rod endwise as said lever is swung toward and away from said arm, a catch bar on said hand lever having notches therein, said catch bar extending across said arm, said arm having a portion with which said notches are engageable to hold said hand lever in selected positions, said catch bar being pivoted on said hand lever to swing toward and away from said arm portion, and spring means yieldably urging said catch bar in a direction to engage its notches with said arm portion.

3. A work holder comprising a relatively stationary base, a standard projecting from said base, an arm projecting laterally from said standard, a rod slidably mounted on said arm for endwise movement substantially at right angles to said arm toward and away from work to be held, a pressure foot on the end of said rod at one side of said arm for engagement with work, a hand lever pivoted on said arm on the side thereof opposite said pressure foot, said hand lever being operatively connected to said rod to move said rod endwise as said lever is swung toward and away from said arm, a catch bar on said hand lever having notches therein, said catch bar extending across said arm, said arm having a portion with which said notches are engageable to hold said hand lever in selected positions, said pressure foot comprising a resilient disc for engaging the work, a rigid disc fixed on said rod, and compressible means acting between and connecting said discs whereby said resilient disc can yield toward said rigid disc while engaged with the work.

4. A work holder comprising a relatively stationary base, a standard projecting from said base, an arm projecting laterally from said standard, a rod slidably mounted on said arm for endwise movement substantially at right angles to said arm toward and away from work to be held, a pressure foot on the end of said rod at one side of said arm for engagement with work, a hand lever pivoted on said arm on the side thereof opposite said pressure foot, said hand lever being operatively connected to said rod to move said rod endwise as said lever is swung toward and away from said arm, a catch bar on said hand lever having notches therein, said catch bar extending across said arm, said arm having a portion with which said notches are engageable to hold said hand lever in selected positions, said arm being mounted on said standard to swing on the longitudinal axis of said standard.

5. In combination, a table top, a standard fixed to rise from said table top, a horizontal arm projecting laterally from said standard in spaced relation to said table top, a generally horizontal hand lever pivoted on said arm to swing in a vertical plane, a substantially perpendicular rod slidably mounted on and projecting below said arm, means operatively connecting said hand lever to said rod, a pressure foot on the lower end of said rod for holding engagement with the upper surface of work supported on said table top, said hand lever being downwardly swingable to depress said rod and forcibly engage said pressure foot with the work and upwardly swingable to elevate said pressure foot from the work, and a latch bar pivoted on said hand lever and depending therefrom, said latch bar having notches and said arm having a portion selectively engageable in the notches to hold said hand lever in a selected position.

WILLIAM R. SMITH.
OTTO R. RICKEL.

REFERENCES CITED

The following references are of record in the file of this patent:

UNITED STATES PATENTS

| Number | Name | Date |
|---|---|---|
| 29,585 | Grabo | Aug. 14, 1860 |
| 2,086,866 | Gwynn | July 13, 1937 |